(12) United States Patent
Houri

(10) Patent No.: US 8,195,126 B1
(45) Date of Patent: Jun. 5, 2012

(54) METHOD AND SYSTEM FOR MANAGING ACCESS TO INFORMATION FROM OR ABOUT A MOBILE DEVICE

(75) Inventor: Cyril Houri, Miami Beach, FL (US)

(73) Assignee: Mexens Intellectual Property Holding LLC, Miami Beach, FL (US)

( * ) Notice: Subject to any disclaimer, the term of this patent is extended or adjusted under 35 U.S.C. 154(b) by 294 days.

(21) Appl. No.: 12/756,620

(22) Filed: Apr. 8, 2010

(51) Int. Cl.
*H04M 3/16* (2006.01)

(52) U.S. Cl. .............. 455/411; 455/404.2; 455/456.1; 455/456.2; 726/21; 726/17; 726/20

(58) Field of Classification Search .......... None
See application file for complete search history.

(56) References Cited

U.S. PATENT DOCUMENTS

| | | | |
|---|---|---|---|
| 6,138,003 A | 10/2000 | Kingdon et al. | |
| 7,190,960 B2 | 3/2007 | Wilson et al. | |
| 7,359,716 B2 | 4/2008 | Rowitch et al. | |
| 7,376,840 B2 | 5/2008 | McCann et al. | |
| 7,505,757 B2 | 3/2009 | Rowitch et al. | |
| 7,600,253 B1 | 10/2009 | Wang | |
| 8,103,250 B2 * | 1/2012 | Sullivan et al. | 455/411 |
| 2002/0177433 A1 * | 11/2002 | Bravo et al. | 455/411 |

* cited by examiner

*Primary Examiner* — Rafael Pérez-Gutiérrez
*Assistant Examiner* — German Viana Di Prisco
(74) *Attorney, Agent, or Firm* — Brian Roffe

(57) ABSTRACT

System and method for controlling access to information about or from computing devices in which an authorization request to enable a first one of the devices to obtain information from or about a second one of the devices is generated and directed to the second device with a token assigned to the first device. Once the token is received by the second device, the authorization request is presented to its user in a form enabling viewing and manually entry of the token into the second device. The user of the first device can, when desired, request information from or about the second device. The request is fulfilled and the information from or about the second device is provided to the first device only after the user of the second device has manually entered the token assigned to the first device.

17 Claims, 4 Drawing Sheets

Device name　　　　　　　　　John's iPhone
Example: John's phone
Send to email address:　　　　yourfriend@gmail.com Your email:　　　　　　　　　mymail@gmail.com Send　　　　　　　　　　　　Cancel

METHOD AND SYSTEM FOR MANAGING ACCESS TO INFORMATION FROM OR ABOUT A MOBILE DEVICE

FIELD OF THE INVENTION

The present invention relates generally to methods and systems for managing access to information from or about a mobile device or a wireless computing device.

The present invention relates more particularly to methods and systems for enabling the location of a first portable wireless computing device or other portable mobile device to be obtained upon request by a second computing device only when the second computing device is authorized to obtain the location of the first device, e.g., upon authorization by a user of the first device.

BACKGROUND OF THE INVENTION

It is often desirable to know the location of a portable wireless computing device to enable entities other than a user of the wireless computing device to, e.g., see whether a friend or family member is close the entity and provide services and tailor advertisements to the user based on his or her location. However, this desire must be balanced by the user's desire to control the ability of others to obtain his or her location.

In the field of systems that determine the location of wireless computing devices while balancing the user's privacy and security considerations, U.S. Pat. No. 6,138,003 (Kingdon et al.) describes a telecommunications system and method that performs authorization checks prior to allowing a location service to position a mobile terminal within a cellular network. The various checks involve ensuring that the requesting agency has authorization to request positioning of mobile terminals, determining whether positioning of mobile terminals is allowed within the cellular network that the mobile terminal is currently located in, verifying the authenticity of the identity of the mobile positioning center, ascertaining whether the mobile subscriber has allowed the requesting agency to position the mobile terminal, and confirming that all relevant criteria for positioning have been met by both the mobile subscriber and the requesting agency.

U.S. Pat. No. 7,359,716 (Rowitch et al.) describes a system that controls authorization of a location determination function of a mobile device. The system considers location determination and location disclosure as separate and independent processes whereby location determination is performed, when necessary, via a first set of network entities to obtain location information for a mobile station and then cached for subsequent disclosure to any number of applications. Location disclosure is performed (when requested) via a second set of network entities to provide the location information. Location determination utilizes a first security procedure for authorization and to obtain a first session key used for location determination. Location disclosure utilizes a second security procedure for authorization and to obtain a second session key used for location disclosure. For a roaming mobile station, location determination is performed via a serving network and location disclosure is performed via a home network.

U.S. Pat. No. 7,505,757 (Rowitch et al.) describes a system that performs location determination by triggering a location-based application to run within a mobile station of a communication system. The application is executed within the mobile station and is triggered only by a network element, such as a mobile positioning center coupled to a base station. The network element authorizes the application that is resident within the mobile station, or run in a device resident elsewhere in the network. The mobile station communicates with the network element over a communication link through the base station and other infrastructure components. The mobile station will only respond to attempts to trigger particular operations, e.g., run particular applications, if the mobile station receives a short message services that includes an SMS Teleservice Identifier that has a particular pre-assigned value.

U.S. Pat. No. 7,600,253 (Wang) describes a system that manages delivery of services between entities, e.g., a person or company asset, based on tokens.

U.S. Pat. Appln. Publ. No. 2004/0203903 (Wilson et al.) describes a system for providing wireless telecommunication services to mobile devices while managing permissions for location-based services. One method includes receiving a stop request with respect to one mobile device to stop other mobile devices from receiving location information with respect to that mobile device. The method updates a central database based on the received stop request, and prohibits other mobile devices from receiving location information with respect to that mobile device until a request to remove the stop is received. Moreover, the system provides options to protect a user's privacy by enabling users to turn off the location feature. As such, users must grant permission before someone else can add them to the list of people he or she can locate. Once granted, users can revoke permission at any time, halting access by any or all individuals to their location information. Once a user gives someone permission to locate his or her phone, that person can do so any time the phone is on unless the user turns off the locating ability to make the phone go "invisible" or revokes access for that person. To prevent unwanted requests, users can permanently block a person from re-requesting access to their location. Further, the system may share a user's location only with parties a user has expressly authorized to receive the user's location.

In spite of the foregoing methods and systems of the prior art, improvements in the management of access to information about a mobile device are needed.

OBJECTS AND SUMMARY OF THE INVENTION

An object of at least one embodiment of the present invention is to provide methods and systems for managing access to information from or about a mobile device, e.g., a location of the mobile device.

Another object of at least one embodiment of the present invention is to provide methods and systems for enabling the location of a wireless computing device to be determined upon request by a second device only when the second device is authorized to obtain the location of the first device.

In order to achieve one or both of the above objects and possibly others, a method for controlling access to information about or from computing devices comprises deriving, using a processor, a plurality of tokens, and to enable transfer of information from or about the computing devices, generating an authorization request to enable a first one of the devices to obtain information from or about a second one of the devices, the authorization request enabling the second device to receive a token assigned to the first device. Once the token is received by the second device, the authorization request is presented to a user of the second device in a form enabling the user of the second device to view and manually enter the token into computer-readable medium in the second device using a user interface of the second device. Then, the user of the first device can, when desired, request information from or about the second device using a user interface of the first device and an information request generating system embodied partly in computer-readable medium in the first device. The request is fulfilled and the information from or about the second device is provided to the first device via an information providing system only after the user of the second device has manually entered the token assigned to the first device.

Without manual entry of the token assigned to the first device by the second device, the user of the second device cannot obtain information from or about the first device. In this manner, the user of the first device can control who is able to obtain information from or about their device, e.g., the location of their device.

A system in accordance with the invention that implements the method includes suitable hardware and software components, e.g., processors and communications devices, resident at the first and second devices and at the server.

Other and further objects, advantages and features of the present invention will be understood by reference to the following specification in conjunction with the annexed drawings.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

A method for controlling access to information from or about wireless computing devices by other computing devices in accordance with the invention is generally based on providing a token to each computing device which is required to be processed by a user of any wireless computing device from or about which information is sought prior to forwarding any information. As described more fully below, this processing is preferably manual entry of the token by the user of the device from or about which information is sought, whereby once the token has been manually entered by the user of this device, information from or about this device, such as its current location, is available to the other device upon generating a request for such information.

The method, and a system that implements the method, will be described below with particular reference to the location of one device being the information sought by the other device. However, the invention is not limited to a location-determination function and encompasses other types of information, as explained below.

Hereinafter, the device that seeks the location of the other device will be referred to as the tracker T, while the device whose location is sought will be referred to as the subject S. The invention contemplates the presence of a plurality of trackers T and subjects S, wherein not all trackers T will be able to obtain the location of each subject S. Rather, each subject S is provided with the capability to control which trackers T can obtain its location.

Figure 1:
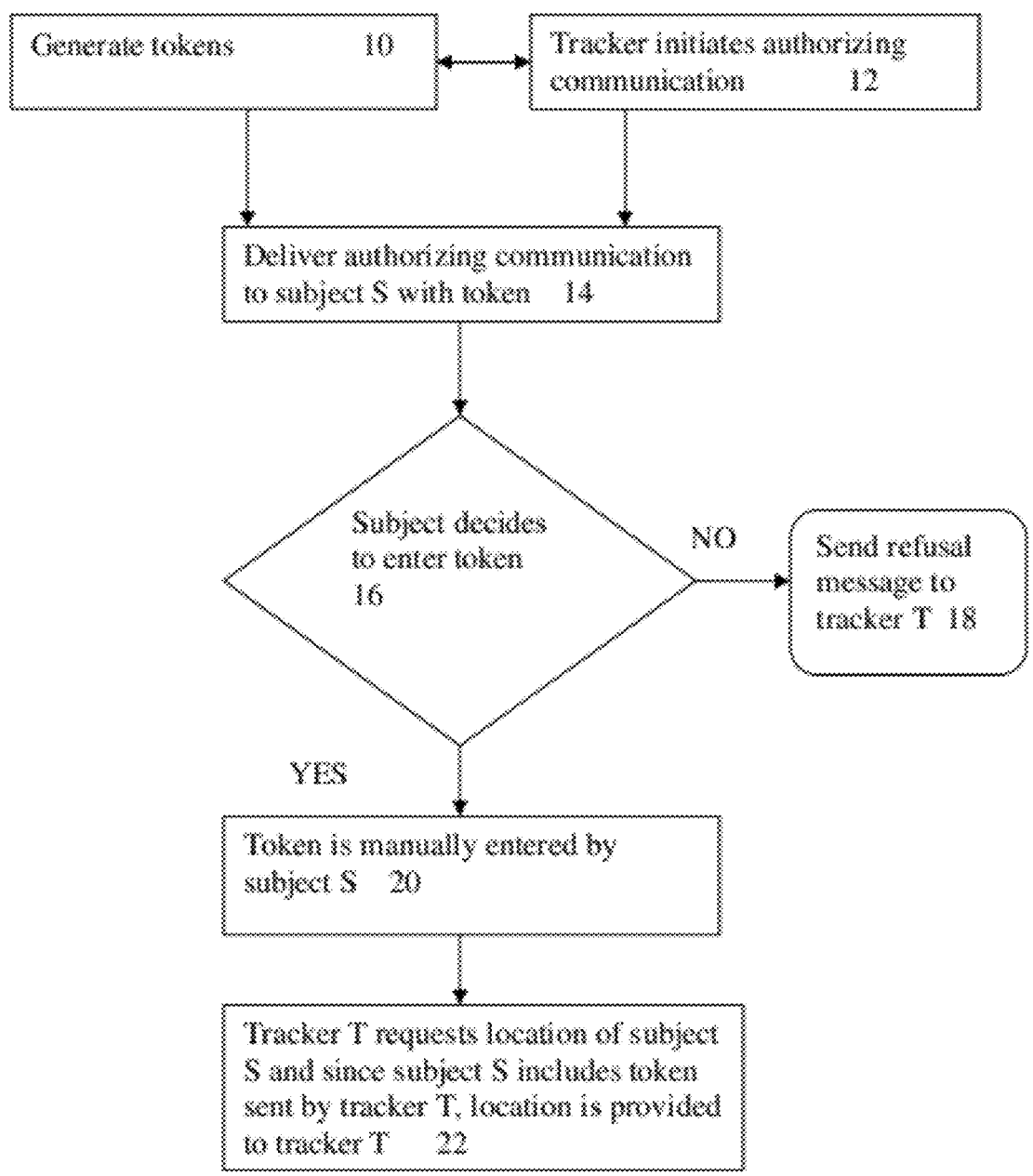
FIG. 1 is a schematic showing main stages of a method for controlling access to information from or about a first wireless device by a second device in accordance with the invention.

Referring now to FIG. 1, one step in a method in accordance with the invention to enable each subject S to have its location provided to one or more trackers T is to generate, using a processor, a plurality of tokens, step 10.

At step 12, the tracker T initiates an authorizing communication including a token to be sent to a subject S that the tracker T wants to track, i.e., obtain the location of, upon approval by the subject S and at discrete times when a user of the tracker T wants to obtain the location of the subject S. The authorizing communication may be an e-mail message, a text message or an SMS message, or any other type of electronic communication. The token may be generated before, during or after the generation of the authorizing communication and associated with the authorizing communication upon or after its generation.

At step 14, the authorizing communication is delivered to the subject S with the token, and in a form enabling the user of the subject S to see the token, e.g., in an e-mail account that is accessible via the subject S on their wireless computing device, i.e., on a display of the subject S.

At step 16, the user of the subject S decides whether to manually enter the token, and thereby allow the tracker T that sent the authorizing communication including the token to see their location whenever the user of the tracker T desires. If the user of the subject S declines, then the tracker T may be notified of the refusal at step 18. Otherwise, the user of the subject S manually enters the token, at step 20. In this manner, the user of the subject S is able to control who can obtain their location, e.g., their friends, family, co-workers and the like, by entering or not entering the tokens they receive from trackers T.

Once entered, the user of the tracker T can request the location of the subject S and since the subject S has manually entered the token sent by tracker T, the location is provided to tracker T, step 22.

The foregoing are the basic steps in a method in accordance with the invention. Additional details of the method, a system for implementing the method, and computer programs resident in the tracker T, the subject S and intervening computer hardware follow.

The token may be derived from a unique communications identification of the tracker T, based on the unique communications identification of the tracker T, or constitutes the unique communications identification of the tracker T. The communications identification of the tracker T may be embodied in a hardware component in the tracker T.

Figures 2, 3:
FIG. 2 shows a web page used in managing tokens in accordance with the invention.
FIG. 3 shows an example of a web page used to send tokens to other devices.

Initiation of the authorizing communication by the tracker T may entail the tracker T requesting that a new token be sent to the subject S. FIG. 2 shows a display screen that is an example of a web page that could appear on a display of the tracker T and includes subjects (by name) to which authorizing communication including tokens have been sent and entered by subjects S (thereby enable the user of the tracker T to locate these subjects S). The display screen also includes an user-activatable area to enable the user of the tracker T to send a new token as part of an authorizing communication to someone whose location is also sought by the tracker T.

FIG. 3 shows an example of a subsequent display screen that would appear when the user of the tracker T wants to send a new token to be able to receive the location of a new subject (step 12). The user of the tracker T would enter the name of the subject S as they want it to appear in their list of findable subjects (the "device name"), shown in FIG. 2, an e-mail address or other address of the subject, and their own e-mail address. When the user is finished, the authorizing communication is sent with notification optionally being provided to the user of the tracker T of the sending and/or delivery of the authorizing communication to the subject S.

Figure 4:
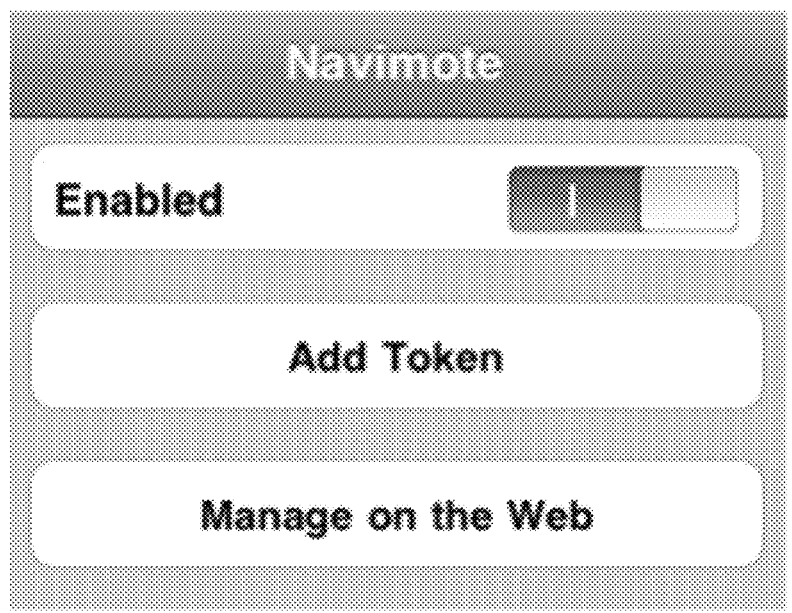
FIG. 4 shows an example of a web page that enables a wireless computing device to control access to information form or about it.

FIG. 4 is an example of a display screen that will appear on a display screen of a display of the subject S. This screen is accessed by the user of the subject S in order to enter a new token that they have received via the e-mail message initiated by the user of the tracker T. The display screen provides an option for a user of the subject S to enable or disable the location providing feature. If disabled, no tracker T will be able to obtain their location even if the subject S has a token associated with the tracker T. If enabled, any tracker T whose token has been entered by the user of the subject S can obtain the location of the subject S.

Figure 5:
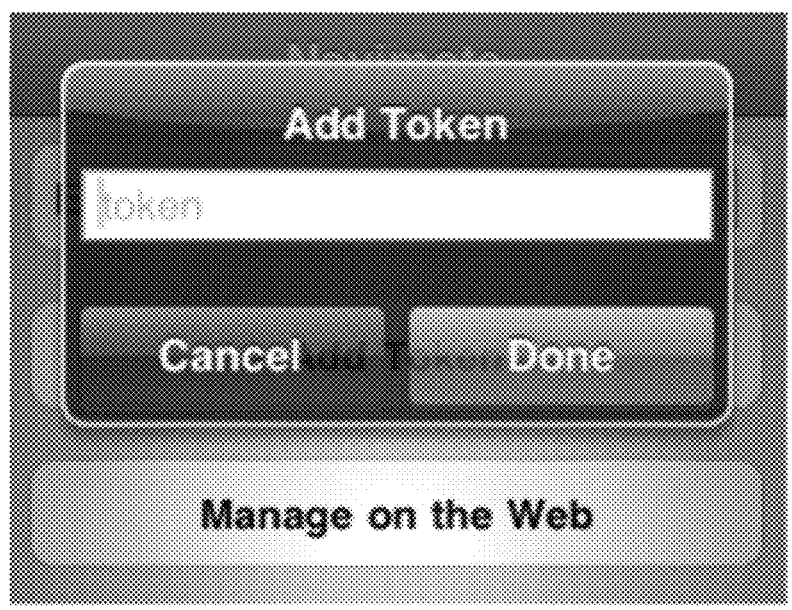
FIG. 5 is an example of the manner in which a token may be entered at a wireless computing device to enable information from or about the wireless computing device to be provided by a sender of the token.

To enter a token, the user of the subject S presses the user-activatable area, "Add Token", and a new display screen, such as shown in FIG. 5 appears. The user then manually enters the token contained in the e-mail message received from the tracker T. After entering the token and clicking the user-activatable area "Done", a message confirming addition of the token may be provided to the user of the subject.

Thereafter, an indication of the manual entry of the token is sent to the tracker T and the "device name" of the subject would appear in the list shown in FIG. 2 on the display of the tracker T thereby enabling the tracker T to click the user-activatable area "Get location", and receive the location of the subject S (provided the subject S has enabled the location-determining function at the time when the request is made).

FIG. 4 also shows a user-activatable area that indicates that the user of the subject S can manage the trackers T whose tokens they have entered using the Internet. This enables the user of the subject S to interact with a computer program at a server, discussed below with reference to FIG. 6, and select access options available using the method in accordance with the invention.

The subject S is typically a wireless computing device which is provided with the authorizing communication via a wireless communications network, i.e., via a wireless transmission received by a receiving component of the wireless computing device, in a manner known to those skilled in the art. For example, any conventional e-mail message program may be used to receive the authorizing communications. The tracker T though may be a conventional desktop or server that is generally used at a fixed location, or another wireless computing device.

In the above-described embodiment, the subject S retained the ability to determine who is able to obtain their location (by entering or not entering received tokens). In other situations, the subject S may not have this ability. For example, the invention may be implemented as a parolee monitoring situation, wherein the subject S is a device adapted to be attached to or worn by the parolee, and one or more trackers T are individuals that would be able to obtain the location of the parolee. In this case, the subject S is not provided with the ability to select whether to allow a tracker to obtain its location, but the subject S is programmed to automatically enter the token.

In another situation, the invention is implemented as an organized dating service with enrolled participants, and the organizer would determine who is able to determine the location of other people, i.e., provide only potential matches for a particular person with the ability to determine the location of that person. The organizer would therefore control the delivery of tokens associated with specific trackers T to selected subjects S and thereby enable only matches between the specific trackers T and the selected subjects S.

A system in accordance with the invention would likely include a plurality of wireless computing devices, with each device being able to be a tracker T, a subject S or both a tracker T and a subject S. Alternatively, a system may include wireless computing devices that are all subjects S and fixed location computing devices, such as desktops or servers that constitute the trackers T.

Figure 6:
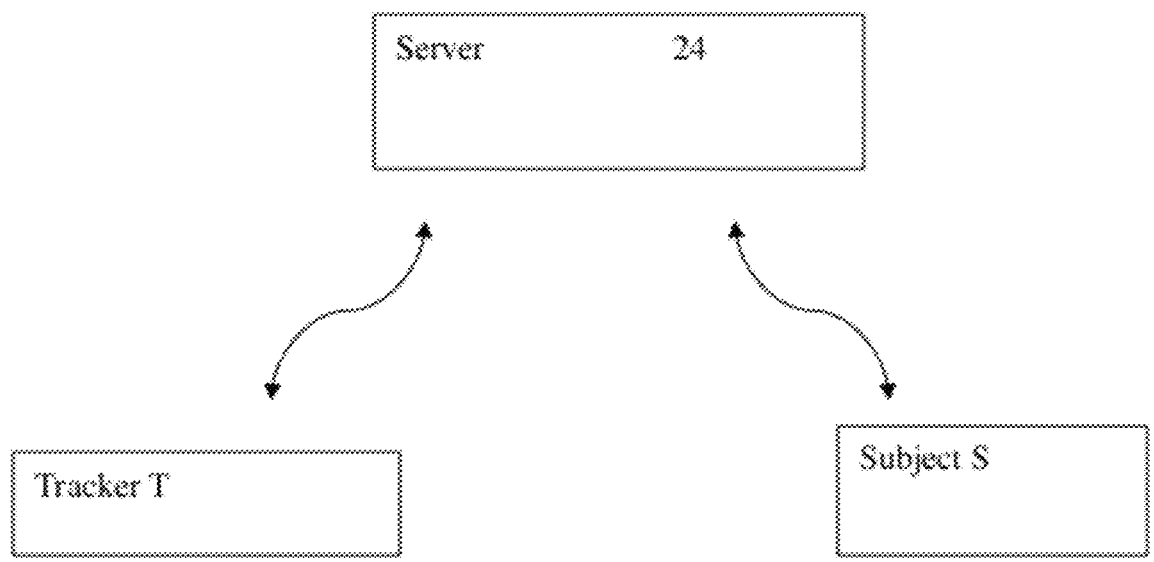
FIG. 6 is a schematic showing the involvement of a server to manage access to information from or about wireless computing devices.

The system would also include a server 24, shown in FIG. 6, that manages the communications to and from the tracker T and the subject S. These communications include the authorizing communication initiated by the tracker T to which the server 24 can add a token (obtained using the screen shown in FIG. 3), and then deliver the authorizing communication including the token to the subject S, as well as the communication to the tracker T generated by the manual entry of the token by the user of the subject S (shown in FIG. 5) which notifies and enables the tracker T to obtain the location of the subject S by updating the list of available subjects S at the tracker T (shown in FIG. 2). Thereafter, the server 24 also handles a location request from the tracker T for the location of the subject S, e.g., when the user of the tracker T selects the "Get location" area for a specific subject S, as shown in FIG. 2.

The location request may be handled in several different ways. In one embodiment, the server 24 continually updates the location of the subject S and stores the locations of subjects S in a database accessible to the server 24, but provides the location to the tracker T only when the tracker's token has been manually entered by the subject S. In another, the subject S provides information to the server 24 to enable the server 24 to determine its location, e.g., using techniques disclosed in U.S. patent application Ser. Nos. 11/549,703, 12/167,649 and 12/172,415.

The tokens that have been manually entered by a subject S may be stored at the server 24, and/or at the subject S itself. Similarly, the tokens that have been sent by a tracker T and manually entered by a subject S may be stored at the tracker T and/or at the server S. In any case, the server 24 is able to ascertain whether there has been a manual entry of the token sent by the tracker T to the subject before providing the location of the subject S to the tracker T when requested by the tracker T.

An advantage of the invention is that it does not require continuous operation in that the computer program at the tracker T is dormant until a request for the location of a subject S is made by the user of the tracker T. At this time, the program is activated and sends a location request to the server 24. The server 24 returns the location of the subject S to the tracker T so that it can be displayed on a display of the tracker T.

In one embodiment, the method and system use push technology in which the connection between the server 24 and the subject S is continuously open when possible, i.e., in the form of an open pipe. The server 24 is programmed to wait for an incoming request for the location of the subject S and upon receipt, sends a message through the pipe to the subject S causing the subject S to determine and send its location through the pipe to the server 24, to be forwarded to the requesting tracker T. If the connection is broken, the server 24 and the subject S are programmed to re-establish the connection when possible.

To expedite the determination of the location of the subject S, the subject S may be programmed to continually determine the identification of non-satellite wireless beacons with which it can communicate, and optionally signal strength, and provide the identification information through the open pipe to the server 24 to enable the server 24 to apply the identification information to an algorithm in order to derive the location of the subject S therefrom. One manner to achieve this is disclosed in the U.S. patent applications mentioned above.

In this case, the determination of the location of the subject S is expedited because the subject S does not have to use the GPS system to determine its position, since use of the GPS system requires the first device to perform preparatory steps in order to be able to provide an accurate determination. Such preparatory steps are eliminated in the invention by having the subject S provide the identification information through the open pipe to the server 24.

The invention has been described above with respect to a system and method for enabling other computing devices to obtain the location of a wireless computing device. However, the invention is equally applicable to enable other computing devices to determine any property that can be determined by a wireless computing device, such properties including conditions of the environment around the wireless computing device. For example, if wireless computing devices include temperature or pressure sensors, then the temperature or pressure of the ambient atmosphere around each wireless computing device could be determined and provided to other authorized computing devices. A temperature or pressure map can therefore be derived in an easy and economical manner by obtaining at a single computing device, the temperature or pressure readings from wireless computing devices distributed throughout an area of interest, with the single computing device being authorized by each wireless computing device to obtain the temperature or pressure reading therefrom.

An important aspect of the method and system described above is that it is not a reciprocal system in that if the tracker T can obtain the location of the subject S by virtue of a user of the subject S manually entering the token sent with the authorizing communication by the tracker T, the subject S does not automatically have the ability to obtain the location of the tracker T. Rather, to enable the user of the subject S to obtain the location of the tracker T, the user of the subject S would have to send an authorizing communication to the tracker T with a token.

Another feature provided by the server 24 is that it can provide via access to a website, the location of a subject S by a device other than the tracker T. If the user of the tracker T registers the token they sent to the subject using a computer program running the website, the tracker could log in to the website via Internet access and obtain the position of the subject S.

An advantage of this feature invention is that it eliminates the problem of losing a wireless computing device. To this end, a user can send themselves a token and manually enter the token at their device. Then, using the website, they can enter the token and see where their device is.

Several computer programs resident on computer-readable medium may be used in the invention. Usually, the same program resident at the tracker T would be resident at the subject S, but in some situations, e.g., a parolee monitoring situation or dating service, the programs would be different.

The subject component of the computer program enables the user of the subject to enable or disable the location providing function, manually add tokens, and manage other aspects of the invention controlled by the subject S. The tracker component of the computer program enables the user of the tracker to initiate sending of tokens to subjects S, list available subjects whose location can be provided, get the location of subjects on the list, and display the location of subjects, possibly relative to the location of the tracker T.

Yet another computer program is resident in the server 24 and is designed to handle communications to and from the tracker T and subject S. This computer program may also generate tokens and associate the tokens to authorizing communications generated by or on behalf of the tracker T. The computer program may direct the authorizing communications and associated tokens to each subject S based on the e-mail address provided in the authorizing communications, receive requests from the tracker T for information about the subject S, e.g., the location of the subject S, and check that a request for the location of a subject S by a tracker T is authorized, i.e., the token of the tracker T has been manually entered by the subject S and only if so, send the information about the subject S, e.g., its location, to the tracker T. The computer program at the server 24 could also determine the location of the subject S.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for controlling access to information from or about computing devices, the method comprising:
   deriving, using a processor, a plurality of tokens;
   generating an authorizing communication to enable a first one of the devices to obtain information from or about a second wireless one of the devices, the authorizing communication enabling the second device to receive a token assigned to the first device;
   presenting the authorizing communication to a user of the second device in a form enabling the user of the second device to view and manually enter the token into computer-readable medium in the second device using a user interface of the second device;

enabling a user of the first device to make a request for information from or about the second device using a user interface of the first device;

transmitting the request to a server including an information management system embodied partly in computer-readable medium in the server; and fulfilling the request and providing the information from or about the second device to the first device via the server only if the user of the second device has manually entered the token assigned to the first device.

2. The method of claim 1, further comprising assigning a token to each device that is derived from a unique communications identification of the device, based on a unique communications identification of the device, or constitutes a unique communications identification of the device.

3. The method of claim 1, wherein the authorizing communication includes the token.

4. The method of claim 1, wherein the information from or about the second device is a location of the second device.

5. The method of claim 1, further comprising maintaining at the first device, a list of wireless computing devices from or about which information can be obtained.

6. The method of claim 1, further comprising:
maintaining a connection between the second device and the server continuously open;
monitoring via the server, requests for information from or about the second device; and
when the server receives a request for information from or about the second device, directing the request from the server through the continuously open connection to the second device to receive in response, information to enable the server to determine the requested information from or about the second device.

7. The method of claim 6, wherein the information from or about the second device is a location of the second device, further comprising:
continuously obtaining identification information about non-satellite wireless beacons communicating with the second device via a communications system resident at the second device;
upon receipt of a request from the server, providing the identification information to the server through the continuously open connection; and
at the server, receiving the identification information, processing the identification information into a location of the second device and providing the location of the second device to the first device.

8. The method of claim 1, further comprising providing the second device with a sensor for detecting a property of an environment in which the second device is situated such that the information from or about the second device is information about a property of the environment in which the second device is situated that is being detected by the sensor of the second device.

9. A system for controlling access to information from or about wireless computing devices, the system comprising:
a server that interacts with the wireless computing devices and a tracker device that desires to obtain information from or about the wireless computing devices,
said server being arranged to:
generate a plurality of tokens,
direct authorizing communications from the tracker device to at least one of the wireless computing devices to obtain information from or about the wireless computing device, each authorizing communication including a token assigned to the tracker device,
receive communications from each wireless computing device indicative of manual entry of the token using a user interface of the wireless computing device,
receive requests from the tracker device for information from or about a specific one of the wireless computing devices;
determine whether a token assigned to the tracker device has been manually entered by the specific one of the wireless computing devices, and only if so,
provide the information from or about the specific one of the wireless computing devices to the tracker device.

10. The system of claim 9, wherein the token generated by the server for each tracker device is derived from a unique communications identification of the tracker device, based on a unique communications identification of the tracker device, or constitutes a unique communications identification of the tracker device.

11. The system of claim 9, wherein the server is further arranged to determine the information from or about the specific wireless computing device.

12. The system of claim 11, wherein the information from or about the specific wireless computing device is a location of the wireless computing device.

13. The system of claim 12, wherein the server is further arranged to direct each wireless computing device to provide information about non-satellite wireless beacons the wireless computing device can communicate with and determine the location of the specific wireless computing device based on the provided information.

14. The system of claim 9, wherein said server is further arranged to maintain a connection to each of the wireless computing devices continuously open.

15. A computer program embodied on a non-transitory computer-readable medium at a first wireless computing device, the computer program being arranged to:
provide information from or about a second wireless computing device by:
generating an authorizing communication to enable the first device to obtain the information from or about the second device, the authorizing communication being directed to the second device with a token assigned to the first device;
enabling a user of the first device to make a request for information from or about the second device using a user interface of the first device;
transmitting the request to a server including an information management system embodied partly in computer-readable medium in the server; and
receiving from the server, the information from or about the second device only when a user of the second device has entered the token at the second device; and
enable information from or about the first device to be provided to another device
by:
presenting a received authorization request to a user of the first device in a form enabling the user of the first device to view and manually enter the token using the user interface of the first device, and
providing an indication of the entry of the token to the server to enable a sender of the token to receive information from or about the first device.

16. The computer program of claim 15, wherein the computer program is further arranged to maintain a list of wireless computing devices from or about which information can be obtained.

17. The computer program of claim 15, wherein the computer program is further arranged to display the received information on a display of the first device.

* * * * *